United States Patent Office 3,010,954
Patented Nov. 28, 1961

3,010,954
CONTROLLED DEGRADATION OF PHOSPHORIC ACID LINKS IN DEOXYRIBOSE NUCLEIC ACID
Orrie M. Friedman, 153 Fuller St., Brookline, Mass.
No Drawing. Filed Jan. 17, 1958, Ser. No. 709,483
14 Claims. (Cl. 260—211.5)

The purpose of the present invention is to provide a chemical method for cleaving secondary phosphoric acid links in organic chemical substances and also to a method for controlling the percentage of any given number of links cleaved.

An object of the present invention is to provide a chemical method by which organic residues or moieties chemically joined or bound together by a secondary phosphoric acid ester link may be cleaved in a controlled and predetermined fashion.

A further object of this invention is to provide a chemical method by which molecules of deoxyribose nucleic acid, hereinafter referred to as DNA, a high molecular weight polymeric material obtained from a variety of natural sources, can be broken down in a practical way to fragments of various smaller molecular weights. These fragments may consist of deoxyribosides and deoxyribotides of the constituent nitrogen basis, principally adenine, guanine, cytosine, and thymine; the various nucleoside diphosphates and dinucleoside monophosphates in addition to a very large variety of polynucleotides of various chain lengths, the so-called oligonucleotides. The above may be accompanied by a certain number of derivatives in which the nitrogen bases have been methylated in addition to a number of methyl phosphate esters. These various products are of scientific interest in chemistry, biology and biochemistry and of potential interest and importance in medicine as such, or as intermediate in the synthesis of other drugs.

Degradation of DNA to fragments of the type described above has been accomplished heretofore in a very limited and essentially impractical way by a few methods, as for example by the use of enzymes singly and in combination. Because of the chemical stability of DNA molecules, chemical degradation in the past has required relatively drastic treatment with strong acids. This has resulted only in complete degradation to the ultimate constituents, nitrogen bases, deoxyribose and phosphoric acid.

The invention claimed herein utilizes the principle that tertiary esters of phosphoric acid are labile to hydrolytic cleavage, in contrast to secondary esters of phosphoric acid, of which the internucleoside links of the DNA molecular chains are composed, which are inert to hydrolytic cleavage. The method further utilizes the fact that secondary phosphoric esters in the acid form are transformed in an essentially quantitative manner to the corresponding tertiary alkyl esters on treatment with certain alkylating agents as for example diazomethane while secondary phosphoric esters in the salt form are unaltered by such treatment. Thus on the treatment of samples of DNA with diazomethane, all the secondary phosphoric acid links in the molecules are transformed by esterification to tertiary methyl esters. The DNA chains are thereby made labile to hydrolytic cleavage at the tertiary links. Thereafter on treatment with alkali, for example, under relatively mild conditions, the chains are broken at these points. The secondary phosphate links in the salt form moreover are not affected and since the ratio of links in the salt form to those in the acid form is readily adjusted by treatment with acid or base, the average size of the products formed may be predetermined.

The process may be graphically represented by:

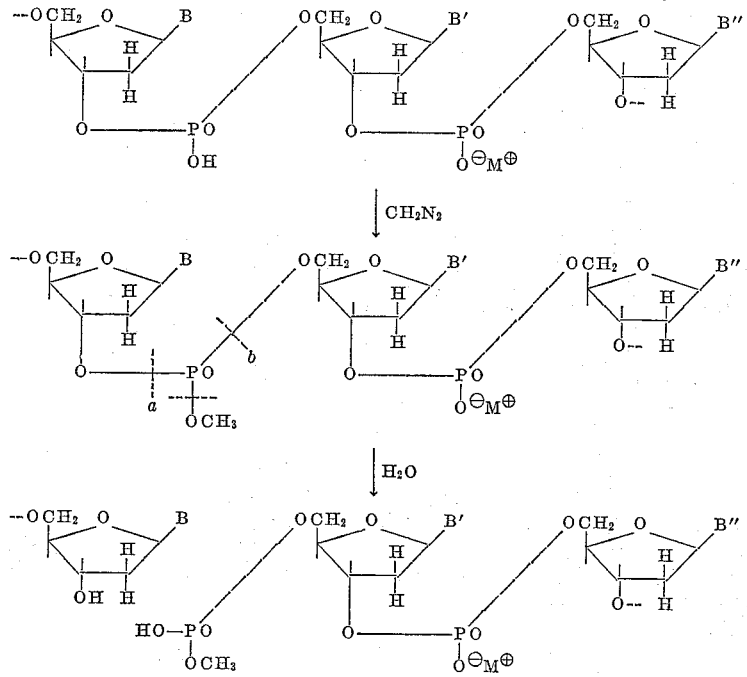

where B, B', B'' are various nitrogen bases, M⊕ is any cation. In this representation cleavage at bond "*a*" is indicated, however it is equally possible that cleavage takes place at bond "*b*."

The following is a description of an application of this invention:

A sample of crude sperm DNA available from General Biochemical Corporation, dissolved in one molar saline solution was centrifuged to remove suspended insoluble impurities and then treated at an ice cold temperature with a small excess of dilute hydrochloric acid. The product that precipitated was washed thoroughly with distilled water, transferred to a suction filter in methanol and dried with air. Electrometric titration shows that 30% of the secondary phosphoric acid links in the molecules of this acidified DNA were in the salt form.

A sample of the above acidified DNA, 1.0 g., in finely divided form suspended in 300 ml. of ethyl ether saturated with water, was treated with 0.5 g. (about 4 equivalents) of diazomethane in 200 ml. of ethyl ether by allowing the mixture to stand for twelve hours at room temperature.

To insure methylation as completely as possible, this methylation procedure was repeated with the same sample removed from the reaction mixture by filtration.

Hydrolysis was brought about by incubation of a solution of 0.25 g. of the methylated DNA above in 5.0 ml. of 2.00 N sodium hydroxide at 35° C. for 24 hours.

The essentially quantitative character of the methylation was revealed by analysis for methyl ester by methoxyl determination. (Calculated: 7.30%. Found: 7.15%.)

The essentially quantitative character of the cleavage of DNA molecular chains at the tertiary phosphate links was shown by:

(1) Electrometric titration which revealed the production of one equivalent each of primary and of secondary phosphoric acid per equivalent of tertiary phosphate ester.

(2) Dialysis which separated the hydrolysis mixture into a dialyzable fraction, 65% and a non-dialyzable fraction, 35%. Electrometric titration revealed that the non-dialyzable fraction consisted of di- to trinucleotide fragments on the average in accord with the calculated prediction.

(3) Microbiological assay with *Thermobacterium acidophilus* revealed that the dialyzable fraction 65%, consisted entirely of neucleosides or mononucleotides which was also in accord with the calculated prediction.

It is clear from the above that this invention may employ in addition to diazomethane various alkylating and arylating agents that will react with phosphoric acid functions to form phosphoric acid esters. Other diazo compounds, as for example, diazoethane, diazopropane, and phenyldiazomethane, in addition to dimethylsulphate, may be used. It is possible quaternary ammonium compounds and sulfonium compounds may also be used.

It is also apparent that this invention may employ for hydrolysis other alkalis in addition to sodium hydroxide. Any preparation that will produce hydroxide ions characteristic of alkaline materials when in solution, as for example, other metal hydroxides, such as potassium and barium, and nitrogen containing bases as ammonium hydroxide, can be used. Acids may also be employed as acetic or dilute hydrochloric acid. Under all circumstances care must be taken, particularly in the case of acids, not to use strong reagents which will bring about undesirable decomposition.

Hydrolysis also may be brought about in essentially neutral aqueous solutions under sufficiently drastic conditions, by adjusting time of reaction and temperature.

Having now described my invention, I claim:

1. A method for degradation of deoxyribose nucleic acid comprising reacting the deoxyribose nucleic acid with diazomethane and allowing the secondary phosphoric acid ester links in said nucleic acid to be transformed thereby to tertiary methyl esters, and hydrolysing into fragments the mixture at the prosphoric acid ester links of said nucleic acid by the addition of an aqueous solution which is substantially nonreactive with said fragments.

2. A method for degradation of deoxyribose nucleic acid comprising esterifying the secondary phosphoric acid links in the deoxyribose nucleic acid, and thereafter hydrolysing into fragments the esterified deoxyribose nucleic acid at the phosphoric acid ester links of said nucleic acid by the addition of an aqueous solution which is substantially nonreactive with said fragments.

3. A method for degradation of deoxyribose nucleic acid comprising reacting the deoxyribose nucleic acid with a member selected from the group consisting of diazoethane, diazomethane, diazopropane and phenyldiazomethane and allowing the secondary phosphoric acid ester links to be transformed thereby into tertiary alkyl esters and thereafter hydrolytically cleaving said nucleic acid at the internucleotide links primarily whereby molecules of said deoxyribose nucleic acid will be cleaved.

4. A method for controlled degradation of deoxyribose nucleic acid comprising reacting a selected quantity of deoxyribose nucleic acid in aqueous solution with a dilute acid solution of selected quantity, isolating the resultant deoxyribose nucleic acid and mixing it with a solution of a phosphoric acid esterifying agent, whereby a portion of the secondary phosphoric acid links of said nucleic acid will be transformed to tertiary phosphoric esters links and thereafter hydrolytically cleaving molecules at the internucleotide links of said nucleic acid into fragments by the addition of an aqueous solution which is substantially nonreactive with said fragments.

5. A method of cleaving secondary phosphoric acid ester links chemically joining nucleotide residues comprising transforming the phosphoric acid ester link into a tertiary phosphoric ester by reacting therewith a secondary phosphoric acid esterifying agent and thereafter hydrolyzing into fragments the mixture at the phosphoric acid ester links of said nucleotide residues by the addition of an aqueous solution which is substantially nonreactive with said fragments.

6. A method of cleaving secondary phosphoric acid ester links chemically joining nucleotide residues comprising transforming the phosphoric acid link to a tertiary phosphoric acid ester link by reacting therewith a secondary phosphoric acid esterifying agent selected from a group consisting of alkylating and arylating agents reactionable with phosphoric acid functions, and thereafter hydrolyzing into fragments the mixture at the phosphoric acid ester links of said nucleotide residues by the addition of an aqueous solution which is substantially nonreactive with said fragments.

7. A method for degradation of deoxyribose nucleic acid comprising reacting the deoxyribose nucleic acid with a secondary phosphoric acid esterifying agent selected from a group consisting of alkylating and arylating agents reactionable with phosphoric acid functions and thereafter hydrolyzing into fragments the mixture at the phosphoric acid ester links of said nucleic acid by the addition of an aqueous solution which is substantially nonreactive with said fragments.

8. A method as set forth in claim 7, wherein the hydrolysis is accomplished by the addition of a dilute acid solution.

9. A method as set forth in claim 7, wherein the hydrolysis is accomplished by the addition of a dilute alkali solution.

10. A method as set forth in claim 7, wherein the hydrolysis is accomplished by the addition of water at an elevated temperature in excess of 35° C.

11. A method of degradation of deoxyribose nucleic acid comprising mixing the deoxyribose nucleic acid with a phosphoric acid esterifying alkylating agent, and allowing the mixture to react and then hydrolyzing the mixture until the molecules of the said nucleic acid are hydrolytically cleaved at the phosphoric acid ester links primarily into fragments with a hydrolyzing reagent substantially nonreactive with said fragments.

12. A method of degradation of deoxyribose nucleic acid comprising mixing deoxyribose nucleic acid with diazomethane and allowing the mixture to react and then hydrolysing the mixture until the molecules of the said nucleic acid are hydrolytically cleaved at the phosphoric acid ester links primarily into fragments with a hydrolyzing reagent substantially nonreactive with said fragments.

13. A method of degradation of deoxyribose nucleic acid comprising mixing the dioxyribose nucleic acid with a member selected from the group consisting of diazomethane, diazopropane, phenyldiazomethane, diazoethane and dimethyl sulphate and allowing the mixture to react and thereafter hydrolyzing the mixture until the molecules of the said nucleic acid are hydrolytically cleaved at the phosphoric acid ester links primarily into fragments with a hydrolyzing reagent substantially nonreactive with said fragments.

14. A method of degradation of deoxyribose nucleic acid comprising mixing the deoxyribose nucleic acid with a phosphoric acid esterifying arylating agent and allowing the mixture to react and thereafter hydrolyzing until the molecules of the said nucleic acid are hydrolytically cleaved at the phosphoric acid ester links primarily into fragments with a hydrolyzing reagent substantially nonreactive with said fragments.

No references cited.